Patented Jan. 18, 1949

2,459,315

UNITED STATES PATENT OFFICE 2,459,315

PROCESS FOR PREPARING METAL SALTS OF PENICILLIN

Moses Wolf Goldberg, Upper Montclair, and Sidney Teitel, Rutherford, N. J., assignors to Hoffmann-La Roche Inc., Nutley, N. J., a corporation of New Jersey No Drawing. Application July 19, 1945,
Serial No. 606,024

7 Claims. (Cl. 260—302)

Our invention relates in general to the preparation of salts of penicillin. More specifically, the invention relates to a new process for the manufacture of penicillin salts of alkali and alkaline earth metals.

A principal object of our invention is to provide a method for making penicillin salts, which is more direct, convenient and economical than methods heretofore employed, and which is particularly adapted to the manufacture of penicillin salts in bulk.

At present, penicillin is manufactured by a process involving essentially the following steps:

(1) Fermentation, by which penicillin is produced in a suitable nutrient medium by penicillin-producing molds;

(2) Isolation of the penicillin from the nutrient medium, and purification of the penicillin, by adsorption or extraction methods, resulting in a relatively concentrated solution of the free penicillin in an organic solvent; and (3) Conversion of the free penicillin into salts ready for therapeutic use, by extraction of the penicillin from the organic solvent by means of an aqueous solution or suspension of an alkaline reagent, whereby an aqueous solution of the corresponding penicillin salt is obtained, followed by freezing of this solution and desiccation in vacuo in the frozen state, to a dry powder.

The process now generally employed, as outlined above, is satisfactory for large-scale operations as far as the steps of fermentation and isolation of the penicillin from the nutrient medium are concerned. However, the process is characterized by the disadvantage that relatively large volumes of the final aqueous penicillin salt solution must be dried from the frozen state, particularly when the calcium salt is to be prepared. The freeze-drying operation requires heavy, expensive, and complicated refrigeration and high vacuum equipment. In addition, removal of the water from the frozen state, requires, even under the most ideal conditions of vacuum and equipment design, a rather extended period of time for completion.

To overcome the disadvantage of the freeze-drying method, it has been proposed to employ dielectric heating as a supplementary process, to reduce the load on the equipment for final desiccation from the frozen state (British Medical Journal, February 17, 1945, page 218). In this operation, the preliminary concentration by means of dielectric heating is followed by a final drying of the concentrated penicillin solution in the frozen state.

We have discovered that the undesirable characteristics of the methods previously employed for manufacturing penicillin salts may be avoided by the use of the simple and expedient method which we disclose hereinafter. This new method is characterized by:

(a) Rapidity of production,
(b) Reduction of operating costs,
(c) Reduction in maintenance costs,
(d) Reduction in space requirements,
(e) Elimination of bulky, complicated and expensive apparatus,
(f) Avoidance of low-temperature and high vacuum control,
(g) Use of readily available inexpensive standard equipment,
(h) Ease of operation,
(i) High overall penicillin salt yield,
(j) Adequate potency and stability of the product.

We have discovered that alkali and alkaline earth metal salts of penicillin can be produced in the form of a dry powder conveniently and with considerable saving of time, labor and costs directly from solutions of free penicillin in organic solvents. In general, the process comprises mixing a solution of free penicillin in an organic solvent with a solution or suspension of an alkali or alkaline earth metal organic compound in an anhydrous organic solvent, or adding the metal organic compound in dry form to the penicillin solution.

The metal organic compound reacts with the free penicillin dissolved in the organic solvent to form the corresponding metal salt of penicillin. The best results are obtained when stoichiometrically equivalent amounts of metal organic compounds are used to react with the free penicillin.

The resulting penicillin salt may be insoluble in the reaction mixture, in which event the salt is filtered off, washed, and freed from solvent by drying in a vacuum oven. However, if the penicillin salt is soluble in the mixture, then a second solvent, which has a low solubility for the salt may be added to precipitate the salt. Alternatively, the salt may be obtained by concentrating or drying the resulting solution of the penicillin salt.

It is pointed out that the initial solution of penicillin in an organic solvent should be anhydrous, or substantially so. If necessary, the solution may be submitted to a suitable drying treatment to accomplish that purpose, as, for example, by the use of a drying agent such as anhydrous sodium sulphate, or by removal of water by azeotropic distillation.

Suitable solvents which may be employed as such or in mixtures for the initial penicillin solution are for example: Esters, such as ethyl acetate, butyl acetate, isopropyl acetate, amyl acetate, benzyl acetate, ethyl butyrate, ethyl benzoate, diethyl malonate, furoic acid ethyl ester; ketones, such as acetone, cyclohexanone, cyclopentanone, ethyl-methyl-ketone, methyl-isobutyl-ketone, diethylketone, acetophenone; halogenated hydrocarbons, such as chloroform, carbon-tetrachloride, ethylene dichloride, chlorobenzene, ethyl bromide; ethers, including cyclic ethers, such as diethyl ether, dibutyl ether, di-isopropyl ether, dioxane, tetrahydrofurane; alcohols, including ether alcohols, such as isopropyl alcohol, amyl alcohol, butyl alcohol, cyclohexanol, cyclopentanol, tetrahydrofurfuryl alcohol; nitriles, such as acetonitrile, benzonitrile, propionitrile; hydrocarbons, such as benzene, toluene, xylene, cyclohexane; and keto-esters, such as ethyl acetoacetate, butyl acetoacetate, 2-carbethoxy-cyclohexanone-1, 2-carbethoxy-cyclopentanone-1, levulinic acid methyl ester and levulinic acid ethyl ester.

Examples of metal organic compound compositions for treatment of the penicillin solution are: Sodium butoxide in butyl alcohol, sodium butoxide in cyclohexanol, potassium isopropoxide in isopropyl alcohol, calcium diethyl malonate in butyl acetate, calcium diethyl malonate in amyl acetate, calcium diethyl malonate in methyl-isobutyl ketone, sodium diethyl malonate in butyl acetate, sodium diethyl malonate in isopropyl acetate, sodium diethyl malonate in methyl-isobutyl ketone, sodium diethyl malonate in cyclohexanol, potassium diethyl malonate in amyl acetate, calcium diethyl malonate in cyclohexanol, magnesium diethyl malonate in butyl acetate, magnesium diethyl malonate in methyl-isobutyl ketone, magnesium diethyl malonate in cyclohexanol, magnesium diethyl malonate in toluene, sodium ethyl-acetoacetate in ethyl acetoacetate, calcium ethyl acetoacetate in ethyl acetoacetate, calcium ethyl acetoacetate in butyl acetate, sodium ethyl acetoacetate in butyl acetate, sodium ethyl acetoacetate in chloroform, calcium ethyl acetoacetate in chloroform, calcium ethyl acetoacetate in ether, sodium ethyl acetoacetate in ether, calcium ethyl acetoacetate in benzene, sodium ethyl acetoacetate in benzene, sodium acetylacetone in butyl acetate, sodium acetylacetone in chloroform, sodium acetylacetone in acetylacetone, calcium acetylacetone in amyl acetate, sodium 2-carbethoxy-cyclohexanone-1 in butyl acetate, sodium phenolate in butyl acetate, potassium phenolate in butyl alcohol, sodium isopropylate in butyl acetate, potassium 2-carbethoxy-cyclohexanone-1 in butyl acetate, potassium 2-carbethoxy-cyclopentanone-1 in methyl-isobutyl ketone, strontium ethyl acetoacetate in ethyl acetoacetate, lithium ethyl acetoacetate in ethyl acetoacetate, and lithium diethyl malonate in butyl acetate.

It will be observed that wide latitude and modification are shown in the metal organic compounds and in the solvents employed for those compounds, as well as in the solvents employed for the penicillin. Practically every organic solvent which has sufficient solubility for penicillin as a free acid can be employed.

For the purpose of this reaction, practically every more or less soluble metal organic compound (of an alkali or alkaline earth metal) can be employed. Such compounds may be, for example, metal salts of organic acids, alcoholates, such as sodium isopropylate and sodium n-butoxide, sodium benzyloxide, potassium benzyloxide, and the corresponding cyclohexanol derivatives, or phenolates, such as sodium phenolate, sodium guaiacolate, sodium $\beta$-naphthoxide, and alkali and alkaline earth metal compounds of salicylic acid esters.

From a practical viewpoint, considering the matter of solubility, availability and cost, we prefer alkali or alkaline earth metal derivatives of organic compounds containing at least one activated hydrogen atom attached to a carbon atom, as, for example, metal derivatives of organic compounds having a malonic ester, $\beta$-keto-ester, 1,3-cyano-carbalkoxy, 1,3-cyano-carbonyl, or a 1,3-dicarbonyl structure. For example, preferred compounds include the alkali and alkaline earth metal derivatives of malonic acid methyl, diethyl, dibutyl, or higher esters; the corresponding esters of monosubstituted malonic acids, such as methyl-malonic acid or ethyl-malonic acid; esters of acetoacetic acid, $\alpha$-methyl-acetoacetic acid, gamma-methyl-acetoacetic acid, $\alpha$-, gamma-dimethyl-acetoacetic acid, etc.; esters of cyano-acetic acid, $\alpha$-cyano-propionic acid, and cyano-succinic acid; 2-cyano-cyclohexanone-1, 2-cyano-cyclopentanone-1, $\alpha$-cyano-acetophenone, and $\alpha$-cyano-acetone; cyclohexane-1,3-dione, acetylacetone, $\alpha$-methyl-acetyl-acetone, gamma-methyl-acetyl-acetone, and benzoyl-acetone.

From a study of the solvents and metal organic compounds listed hereinabove, and in the examples which follow, those skilled in the art will understand how to carry out the process of our invention. It will be appreciated that mixtures of suitable solvents and mixtures of metal organic treating materials can be employed, as well as single solvents or treating materials. Accordingly, many variations and modifications in specific embodiments of our invention will be obvious to those skilled in the art, in view of the teachings herein.

Having outlined the general procedure and scope of our invention, the following examples are given to illustrate specific processes for obtaining penicillin salts by our procedure:

*Example 1*

To one hundred cc. of a penicillin butyl acetate solution, obtained, for example, by acidifying an aqueous penicillin solution to pH 3 and extracting with butyl acetate, and having an apparent content of 1,300,000 units of penicillin, as determined by extraction with aqueous sodium hydroxide to pH 7.4 and biological testing of the penicillin obtained by lyophilic drying of this extract, were added at 15° C. with stirring, 6.5 cc. of a 2.5 N solution of calcium diethyl malonate in diethyl malonate. A precipitate formed immediately. Stirring was continued for 5 minutes, and the mixture was then centrifuged. The residue was washed with two 10 cc. portions of dry butyl acetate and finally with two 10 cc. portions of dry benzene. The residue, after drying at 20 mm. and 50° C. for 3 hours was a light yellow powder. It weighed 2.72 grams, and its potency was 550 units per mg. A total of 1,500,000 units was therefore obtained, or 15% more than by extraction with aqueous alkali. The calcium penicillin was found to retain all its activity even after 7 days' storage at 50° C.

Example 2

To one hundred cc. of a penicillin butyl acetate solution, having an apparent content of 2,300,000 units of penicillin (determined as in Example 1), were added at 15° C. with stirring, 11.5 cc. of a 2.5 N solution of sodium diethyl malonate in diethyl malonate. A precipitate formed immediately. Stirring was continued for 5 minutes, and the mixture was then centrifuged. The residue was washed twice with 10 cc. dry butyl acetate, followed by two washings with 10 cc. dry benzene. The residue, after drying at 20 mm. and 50° C. for 3 hours, was a light yellow powder weighing 4.94 grams. It was completely soluble in water, giving a pH of 6.5. The potency was 528 units per mg. A total of 2,600,000 units were thus obtained, or 13% more than by aqueous extraction.

Example 3

Dry potassium penicillin was obtained in the same way as in Example 2 by using potassium diethyl malonate instead of the sodium compound.

Example 4

To seventy cc. of a penicillin butyl acetate solution, having an apparent content of 1,000,000 units (determined as in Example 1), were added at 25° C., slowly and with stirring, 6.8 cc. of a 1.5 N solution of magnesium diethyl malonate in diethyl malonate. Stirring was continued for 5 minutes. The mixture was then centrifuged, and the residue washed with dry butyl acetate and then with benzene. When the residue was freed of solvent by drying at 50° C. and 20 mm. for 3 hours, it was a light yellow powder, weighing 2.44 grams, and assaying 535 units per mg., corresponding to a total of 1,300,000 units.

Example 5

Two hundred cc. of a penicillin butyl acetate solution, having an apparent content of 800,000 units (determined as in Example 1), were heated at 50° C. (bath temperature) and 30 mm. vacuum until 15 cc. had distilled out. The residue was cooled to 25° C., and while stirring, 4.0 cc. of a 1.3 N solution of sodium ethyl acetoacetate in ethyl acetoacetate was slowly added to it. The finely divided precipitate that formed was filtered off, washed with dry butyl acetate, then benzene, and finally freed of solvent by drying in high vacuum at room temperature. A very light yellow, finely divided powder was obtained, weighing 1.43 grams, which was completely soluble in water and assayed 425 units per mg. A total of 610,000 units were thus obtained, corresponding to a 76% recovery. Another 220,000 units were obtained by washing the butyl acetate filtrate of the penicillin sodium precipitate with water.

Example 6

A 200 cc. aliquot of the butyl acetate solution used for the experiment described in Example 5, was concentrated to a volume of 40 cc. by distillation at 50° C. (bath temperature) and 20 mm. vacuum. To the stirred 40 cc. were slowly added at 25° C. 4.0 cc. of a 1.3 N solution of sodium ethyl acetoacetate in ethyl acetoacetate. The precipitate was filtered off and was treated exactly as in Example 5. The light yellow powder weighed 1.65 grams and assayed 515 units per mg., corresponding to a total recovery of 850,000 units or 6% more than the 800,000 units found by extraction with aqueous alkali. The butyl acetate filtrate of the penicillin sodium precipitate was shaken out with water. The aqueous phase was found to have a pH of 6.8 and contained 20,000 units, or another 2.5%.

Example 7

To one hundred cc. of a penicillin solution in ethyl acetoacetate, having an apparent content of 835,000 units (determined by extraction with an aqueous buffer and testing the solution) were slowly added 2.30 cc. of a 1.25 N solution of sodium ethyl acetoacetate in ethyl acetoacetate. A precipitate formed immediately, and after 5 minutes' stirring at room temperature, it was filtered off and washed with two 20 cc. portions of dry benzene. The residue was dried in high vacuum at room temperature. A light yellow powder, weighing 1.30 grams and assaying 600 units per mg. was obtained. It was completely soluble in water. The yield was 780,000 units or 93%. The filtrate from the precipitated sodium penicillin was extracted with 10 cc. water and the latter found to contain 160,000 units, or an additional 19%.

Example 8

Five hundred cc. of a chloroform extract of free penicillin, having an apparent content of 2,600,000 units (determined as in Example 1), was freed of water by freezing at −60° C. and filtering. The dry filtrate was concentrated in a 50 mm. vacuum at 35° C. to 100 cc. volume. To this was added, while stirring, 10.0 cc. of a 2.5 N solution of calcium diethyl malonate in diethyl malonate. The precipitate was filtered off, washed with anhydrous chloroform and dried at 50° C. and 20 mm. vacuum for 3 hours. The light yellow powder thus obtained weighed 4.68 grams and assayed 640 units per mg., corresponding to a total of 3,000,000 units. This is 15% more than was found by aqueous extraction.

Example 9

Two hundred-fifty cc. of a penicillin ether solution, having an apparent content of 790,000 units (determined as in Example 1), was cooled to −60° C. and the ice filtered off. The water-free filtrate was then concentrated to 50 cc. at 100 mm. and 25° C. To the concentrate was added 1.75 cc. of a 2.5 N solution of calcium diethyl malonate in diethyl malonate. The mixture was shaken thoroughly for 5 minutes at room temperature and then centrifuged. The residue was washed with three 10 cc. portions of dry ether, and finally dried at 50° C. and 20 mm. vacuum for 1 hour. The resulting powder, assayed 620 units per mg., corresponding to a total of 860,000 units, or 9% more than found by aqueous extraction.

Example 10

Four hundred cc. of a penicillin butyl acetate solution, having an apparent content of 2,500,000 units (determined as in Example 1), was concentrated at 20 mm. and 50° C. (water bath temperature) to a volume of 80 cc. To the stirred solution were slowly added, at 10° C., 8.7 cc. of a 1.3 N solution of sodium acetyl acetone in acetyl acetone. Precipitation was immediate. After 5 minutes' stirring the mixture was centrifuged. The residue, after being washed with dry butyl acetate and dry benzene, was freed of solvent by drying in vacuum (20 mm.) at 50° C. The resulting light yellow powder weighed 3.58 g., was completely soluble in water (pH 7.0) and assayed 880 units per mg. It therefore contained a total of 3,000,000 units, or 20% more than found in the aqueous control extraction.

Example 11

One hundred cc. of a penicillin butyl acetate solution, having an apparent content of 200,000 units (determined as in Example 1), were concentrated at 20 mm. vacuum and a bath temperature of 50° C. to a volume of 20 cc. To the concentrate were added, with stirring 4.92 cc. of a 0.8 N solution of sodium 2-carbethoxy-cyclohexanone-1 in butyl acetate. A precipitate was immediately formed. This was filtered off and washed with two 10 cc. portions of dry benzene, and then dried at room temperature in high vacuum. The resulting light yellow powder weighed 1.1 grams and assayed 183 units per mg., corresponding to a total of 200,000 units. It was completely soluble in water.

Example 12

To two hundred cc. of a penicillin butyl acetate solution, having an apparent content of 100,000 units (determined as in Example 1), were added, under anhydrous conditions and with stirring, 80 cc. of a 0.5% solution of sodium phenolate in dry acetone. Stirring was continued for 1 hour at room temperature. The precipitate was filtered, the residue washed with anhydrous benzene, and dried at room temperature in high vacuum for 1 hour. A light tan colored powder was obtained, weighing 2.2 grams and assaying 440 units per mg.

Example 13

To three hundred cc. of a penicillin butyl acetate solution, having an apparent content of 360,000 units (determined as in Example 1), were added, with stirring, 11.0 cc. of a 0.4 N sodium isopropylate solution in isopropanol. The quantity of reagent to be used was determined by titrating an aliquot of the same butyl acetate solution to pH 7 with 0.5 N aqueous sodium hydroxide. The addition of sodium isopropylate gave an immediate precipitation. Stirring was continued at 4° C. for 1 hour. The precipitate was filtered, the residue washed with anhydrous benzene, and then dried in high vacuum at 35° C. for 1 hour. The penicillin sodium thus obtained weighed 1.4 grams and assayed 250 units per mg.

Example 14

To two hundred-fifty cc. of an anhydrous ether solution of penicillin, with an apparent content of 215,000 units (determined as in Example 1), were added 125 cc. of anhydrous n-butanol and the solution concentrated under vacuum at 25° C. to a volume of 125 cc. To this concentrate were added, with stirring, 31.4 cc. of a 0.1 N solution of sodium n-butoxide in n-butanol. No precipitation occurred, the solution remained brilliant clear. The solution was then taken down to dryness at 20 mm. vacuum and 45° C. (bath temperature), and the last traces of solvent were removed at 1 mm. vacuum. The residue, a dark brown colored, brittle, lacquer-like film was ground to a yellow powder, weighing 0.49 gram. It was completely soluble in water, and its aqueous solution had a pH of 6.7. The potency was 500 units per mg., corresponding to a total of 245,000 units, or 30,000 units more than obtained by aqueous extraction of the original ether solution.

Example 15

An identical solution of penicillin in n-butanol, neutralized with 31.4 cc. of 0.1 N sodium n-butoxide, as described in Example 14, was treated with petroleum ether (30–60° C.) until no further precipitation occurred. This required 400 cc. of petroleum ether. The precipitate was filtered off, and freed of solvent by drying at 50° C. and 20 mm. vacuum for 1 hour. The resulting finely divided yellow powder, weighed 0.44 gram, was completely soluble in water, and its aqueous solution had a pH of 6.9. It assayed 510 units per mg., corresponding to a total of 224,000 units. This compares favorably with the 215,000 units obtained by aqueous extraction of the original ether extract.

Example 16

Two hundred cc. of a penicillin methyl-isobutyl-ketone solution, having an apparent content of 2,680,000 units (determined as in Example 1), were concentrated at 30 mm. vacuum and a bath temperature of 50° C. to a volume of 100 cc. To the concentrate were added, with stirring, 5.25 cc. of a 2.9 N solution of calcium diethyl malonate in diethyl malonate. Precipitation was immediate. After 5 minutes' stirring, the mixture was filtered on a Büchner funnel. The precipitate was washed with two 20 cc. portions of benzene, and then dried in a vacuum oven at 20 mm. and 50° C. for 3 hours. The resulting light yellow powder weighed 4.31 grams and assayed 620 units per mg., or a total of 2,670,000 units. To the clear filtrate was added 400 cc. petroleum ether (30–60° C.). A slight precipitate formed, which was filtered off, washed with 20 cc. petroleum ether and dried in a vacuum oven at 50° C. The light yellow powder so obtained, weighed 0.05 gram and contained 20,000 units.

Example 17

Nine hundred-forty cc. of a penicillin butyl acetate solution, having an apparent content of 1,910,000 units (determined as in Example 1), were concentrated at 20 mm. vacuum and a bath temperature of 50° C. to a volume of 180 cc. The concentrate was filtered through a sterile Seitz pad into a sterile 250 cc. centrifuge tube. To this sterile filtrate was added aseptically 7.6 cc. of a 1.8 N solution of sodium diethyl malonate in diethyl malonate, which had also been sterilized by Seitz filtration. A precipitate formed immediately. It was centrifuged down; the supernatant was aseptically removed, and the precipitate was aseptically washed with 20 cc. of butyl acetate (100%), which had been sterilized by boiling. The suspension was centrifuged, the butyl acetate aseptically removed, and the precipitate washed again with 40 cc. of sterile benzene, which had been sterilized by boiling. The benzene was aseptically removed, and the precipitate was dried by placing the centrifuge tube with its contents in a vacuum oven at a temperature of 50° C. and 20 mm. vacuum for 3 hours. The light yellow powder of penicillin sodium so obtained weighed 4.0 grams, assayed 543 units per mg., or a total of 2,172,000 units. This powder, when tested by known bacteriological technique, was found to be sterile.

Example 18

To five hundred cc. of a penicillin solution in dry ether, having an apparent content of 1,600,000 units (determined as in Example 1), was added, with stirring, a solution of 2.6 g. calcium oleate in ether. Stirring was continued for 30 minutes, then most of the ether was distilled off in vacuo, and the precipitate centrifuged. The product was washed several times with dry ether and then dried in vacuo. The resulting light yellow powder weighed 2.7 grams and assayed 620 units per mg., or a total of 1,674,000 units.

*Example 19*

To one hundred cc. of a penicillin butyl acetate solution, having an apparent content of 2,300,000 units of penicillin (determined as in Example 1), were added with stirring 5.23 grams of dry powdered sodium diethyl malonate. Stirring was continued for 20 minutes, then the precipitate formed was filtered off, and washed on the filter twice with 10 cc. dry butyl acetate and twice with 10 cc. dry benzene. After drying in vacuo at 50° C. for 4 hours, a light yellow powder was obtained, weighing 4.92 grams. It was completely soluble in water, and assayed 530 units per mg., corresponding to a total of 2,600,000 units.

*Example 20*

To five hundred cc. of a penicillin solution in dry ether, having an apparent content of 1,600,000 units (determined as in Example 1), were slowly added, with stirring, 3 g. of barium linoleate in ether. Stirring was continued for 1 hour, then most of the ether was distilled off in vacuo, and the precipitate centrifuged. The product was washed several times with dry ether and then dried in vacuo. The resulting light yellow powder weighed 3 grams and assayed 535 units per mg.

In those instances where the penicillin salt is soluble in the reaction mixture, concentration or evaporation to dryness may be employed to obtain the salt.

Example 14 illustrates a case where the penicillin salt which is formed is soluble in the reaction mixture, and is recovered by drying under vacuum.

Example 15 illustrates a case where the penicillin salt which is formed is soluble in the reaction mixture, and is obtained by precipitation with an added organic precipitant.

The process of our invention can be employed for preparing penicillin salts of alkali and alkaline earth metals, including sodium, potassium, magnesium, lithium, strontium, barium and calcium salts.

Our new method may be employed for preparing either sterile or non-sterile penicillin salts. If sterile salts are required, as for parental administration, the process should be carried out under aseptic conditions, and with sterile reactants. If, however, the salts need not be sterile, as in the case of penicillin for oral administration, such rigid precautions need not be observed. Example 17 illustrates a procedure for preparing a sterile penicillin salt.

Since certain changes in carrying out the above process may be made without departing from the scope of the invention, it is intended that all matter contained in the above detailed description shall be interpreted as illustrative and not in a limiting sense.

We claim as our invention:

1. A process for preparing penicillin salts of alkali and alkaline earth metals which comprises reacting penicillin dissolved in a substantially anhydrous organic solvent with an organo metallo compound of the group consisting of alkali metal and alkaline earth metal dialkyl malonates, alkyl acetoacetates and acetylacetone.

2. A process for preparing alkali metal salts of penicillin which comprises reacting penicillin dissolved in a substantially anhydrous organic solvent with an alkali metal dialkyl malonate.

3. A process for preparing sodium penicillin which comprises reacting penicillin dissolved in a substantially anhydrous organic solvent, with sodium diethyl malonate dissolved in diethyl malonate.

4. A process for preparing sodium penicillin which comprises reacting penicillin dissolved in substantially anhydrous butyl acetate with sodium diethyl malonate dissolved in diethyl malonate.

5. A process for preparing alkaline earth metal salts of penicillin which comprises reacting penicillin dissolved in a substantially anhydrous organic solvent with an alkaline earth metal dialkyl malonate.

6. A process for preparing calcium penicillin, which comprises reacting penicillin dissolved in a substantially anhydrous organic solvent, with calcium diethyl malonate dissolved in diethyl malonate.

7. A process for preparing penicillin salts of alkali metals, which comprises reacting penicillin, dissolved in a substantially anhydrous organic solvent, with an alkali metal ethyl acetoacetate.

MOSES WOLF GOLDBERG.
SIDNEY TEITEL.

REFERENCES CITED

The following references are of record in the file of this patent:

UNITED STATES PATENTS

| Number | Name | Date |
| --- | --- | --- |
| 2,399,840 | Wachtel | May 7, 1946 |

FOREIGN PATENTS

| Number | Country | Date |
| --- | --- | --- |
| 558,320 | Great Britain | 1943 |

OTHER REFERENCES

Abraham, British J. of Exp. Path., vol. 23, June 1942, pages 103–114.

Charles Pfizer & Co., 12–44, "Examination of Penicillin Mother Liquor," page 24.